(12) United States Patent
Voigt et al.

(10) Patent No.: US 6,230,530 B1
(45) Date of Patent: May 15, 2001

(54) LOCK REMINDER SYSTEM

(76) Inventors: Che Ram Souza Voigt, 505 Divisadero St. Unit B, San Francisco, CA (US) 94117; Ronald Glen Bond, 3559 #A 17th St., San Francisco, CA (US) 94110-1002

( * ) Notice: Subject to any disclaimer, the term of this patent is extended or adjusted under 35 U.S.C. 154(b) by 0 days.

(21) Appl. No.: 09/358,581

(22) Filed: Jul. 20, 1999

(51) Int. Cl.[7] .................................................. E05B 17/00
(52) U.S. Cl. .............................. 70/441; 70/226; 70/237; 70/455
(58) Field of Search ............................. 70/237, 225, 226, 70/455, 423, 424, 441, 259, 432

(56) References Cited

U.S. PATENT DOCUMENTS

| | | | | |
|---|---|---|---|---|
| 3,421,350 | * | 1/1969 | Shanok et al. | 70/455 |
| 3,434,318 | * | 3/1969 | Thiry | 70/455 |
| 3,564,744 | * | 2/1971 | Shook | 70/455 X |
| 4,073,165 | * | 2/1978 | Grundstrom et al. | 70/455 X |
| 4,118,962 | * | 10/1978 | Block et al. | 70/455 |
| 4,858,454 | * | 8/1989 | McAnulty et al. | 70/455 |
| 5,003,795 | * | 4/1991 | Hoke | 70/455 X |
| 5,195,342 | * | 3/1993 | Werner | 70/423 X |
| 5,419,408 | * | 5/1995 | Ellrodt et al. | 70/226 X |
| 5,689,981 | * | 11/1997 | DeLuca et al. | 70/226 |
| 5,746,078 | * | 5/1998 | Kiernan | 70/455 X |
| 5,823,025 | * | 10/1998 | Phifer | 70/226 |
| 6,082,160 | * | 7/2000 | Martyniak | 70/431 |

\* cited by examiner

Primary Examiner—Suzanne Dino Barrett
(74) Attorney, Agent, or Firm—Risto A. Rinne, Jr.

(57) ABSTRACT

An apparatus for use with a control switch of a machine, such as an ignition switch of a motor vehicle, and with a locking device that is used to secure the machine when the machine is not in operation includes a covering that is detachably-attachable with respect to the control switch and the locking device. The covering is disposed in one of two positions. It is disposed in a first position over the control switch so as to prevent use of the control switch when the locking device is attached to the machine or it is disposed in a second position over a portion of the locking device so as to prevent use of the locking device when the locking device is not attached to the machine. When the covering is disposed over the control switch it serves as a reminder indicating that the locking device is attached to the machine. Alternative embodiments are described that provide various ways for making the covering and for attaching it to the control switch and to the locking device.

26 Claims, 2 Drawing Sheets

LOCK REMINDER SYSTEM

BACKGROUND OF THE INVENTION

1. Field of the Invention

The present invention, in general, relates to locks that are used to prevent theft of a motor vehicle and, more particularly, to devices that warn an operator that such a lock is engaged with the vehicle.

There are times when operation of a machine, in particular, a motor vehicle, can occur for a limited period of time or for a limited distance even when a lock that is intended to deter the theft of the vehicle is attached to the vehicle. Operation of the vehicle during those times can damage the vehicle and possibly inflict harm to the operator.

For example, an effective deterrent to motorcycle theft is a lock that is attached to a disk portion of a disk brake. These types of locking devices are referred to as "disk brake" locks. A disk brake lock is typically secured through one of the holes that are normally provided in the disk. If the motorcycle were to be driven with the disk lock in place, the driver would likely be able to proceed a short distance (i.e., an amount that is less than the circumference of the wheel) until the disk brake lock came into contact with the brake caliper or some other part of the motorcycle, such as a fork tube, thereby causing the wheel to abruptly cease its rotation.

The resulting sudden stop would likely cause the motorcycle to fall over. The driver likely would be thrown from the motorcycle and might be injured as a result. The moment of inertia of the wheel combined with the inertia of the motorcycle and driver would likely cause damage to any of a fork, a disk (also referred to as a "rotor"), a wheel, and a brake caliper portion of the motorcycle. Other parts of the motorcycle may also be damaged by the fall. The cost of such a mishap could easily exceed several hundred dollars.

While the intent of such a locking device is to prevent theft of the motorcycle, the locking device can nevertheless result in structural damage to the motorcycle and physical harm to the operator if he simply forgets that the disk brake locking device is installed. This he can easily do by inserting a key into the ignition, starting the motorcycle, and driving off.

Locking devices that are intended to prevent theft of other types of motor vehicles, such as a snowmobile, boat, automobile, or airplane may be subject to similar consequences if the motor vehicle is inadvertently operated while the locking device is still engaged (i.e., attached).

Devices useful to warn an operator that a locking device is attached to the vehicle are known and include flags and other similar devices. The problem is that no matter how visible a warning device may be, eventually the operator will become accustomed to it. Once this occurs he may not notice that it is in place.

Furthermore, there are times when the operator will be under emotional stress, such as when he is in a hurry. During such times, the pressure of the moment may cause him to deviate from his normal routine. Ideally, a lock reminder would preclude operation of the vehicle until the operator has been alerted that the locking device is still engaged with the vehicle, regardless of the "stress" the operator may feel.

Another disadvantage of certain current warning devices is that there is, generally, no mandate that they be used. In other words, the vehicle and the locking device can be used without first having to also install the warning device. This can lead to situations where the warning device is not present to indicate that the locking device is attached to the vehicle. While there may be no way to ensure that a warning device must always be used, there is a need for a lock reminder system that takes the operator through a sequence of steps that, if followed, forces him to use the lock reminder system.

Accordingly, there exists today a need for a lock reminder system that would provide an indication to an operator of a machine that a locking device is attached to the machine and which, if properly used, will provide such an indication before the vehicle can be used.

Clearly, such a system would be useful and desirable.

2. Description of Prior Art

Lock reminders, locks, and locking devices are, in general, known. For example, the following patents describe various types of these devices:

U.S. Pat. No. 1,534,745 to Stapleton, Apr. 21, 1925;
U.S. Pat. No. 1,807,540 to Makranczy, May 26, 1931;
U.S. Pat. No. 2,198,484 to Merkl, Apr. 23, 1940;
U.S. Pat. No. 2,982,041 to Kent, May 2, 1961;
U.S. Pat. No. 2,988,836 to Oberfield, Jun. 20, 1961;
U.S. Pat. No. 4,297,863 to Glock, Nov. 3, 1981;
U.S. Pat. No. 4,631,943 to Hoener, Dec. 30, 1986;
U.S. Pat. No. 5,265,451 to Phifer, Nov. 30, 1993;
U.S. Pat. No. 5,435,160 to Linsalato et al., Jul. 25, 1995;
U.S. Pat. No. 5,492,206 to Shieh, Feb. 20, 1996;
U.S. Pat. No. 5,595,080 to Whinton, Jan. 21, 1997;
U.S. Pat. No. 5,730,008 to Case et al., Mar. 24, 1998;
U.S. Pat. No. 5,746,078 to Kiernan, May 5th, 1998; and
U.S. Pat. No. 5,870,916 to Mahot et al., Feb. 16, 1999.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a lock reminder system that helps to prevent the use of a locked machine.

It is also an important object of the invention to provide a lock reminder system that helps to prevent the use of motor vehicle that has a locking device attached thereto.

Another object of the invention is to provide a lock reminder system that helps to prevent the use of motorcycle that has a locking device attached thereto.

Still another object of the invention is to provide a lock reminder system that is adapted for use with various types of locking devices.

Still yet another object of the invention is to provide a lock reminder system that is adapted for use with a key actuated lock.

Yet another important object of the invention is to provide a lock reminder system that is adapted for use with a combination type of a lock.

Still yet another important object of the invention is to provide a lock reminder system that is adapted for use with an engine kill switch.

A very important object of the invention is to provide a lock reminder system that provides a covering interchangeable between a locking device and a control switch of a machine.

Briefly, a lock reminder system for use with a key operated lock that is constructed in accordance with the principles of the present invention has a detachable covering that is placed either over a keyhole of a locking device or over a control switch of a machine. The covering is detachably-attachable with respect to both the locking device and the control switch. The control switch may include an ignition switch, an engine kill switch, or the like. The machine may include any type of a motor vehicle, such as a motorcycle. The locking device may include any key actuated lock or a combination type of a lock including, for example, disk brake locks, cable locks, chain locks, and other novel types of the locking devices. When the covering is placed over the locking device it can not be opened. The locking device is normally opened when it is to be attached to the machine, for example, to aid in preventing theft of the machine. The covering is then detached apart from the locking device and is placed over the control switch, for example, over an ignition switch of a motorcycle. When the operator returns to use the motorcycle, he is unable to place the ignition key in the ignition switch (i.e., the control switch) because the covering is blocking access to it. This serves as a reminder to the operator that the locking device is still attached to the motorcycle. The locking device is then removed from the motorcycle and the covering is then removed from the ignition switch and is placed over the locking device. The locking device is stored where it is normally placed during operation of the motorcycle, such as in a compartment on the motorcycle or in a pocket of the operator. The ignition key is then placed in the ignition switch and the motorcycle is ready for starting and use. When the locking device is to be attached to the motorcycle, the covering prevents it from being opened. This serves as a reminder to the operator to remove the covering from the locking device and to place the covering over the ignition switch. After the covering has been removed from the locking device it may be opened and attached to the motorcycle. The process is repeated each time the motorcycle is either secured by the locking device or is freed from the locking device. The method for detachably-attaching the covering to the locking device and to the control switch is by any preferred method including a VELCRO type of a hook and loop fastener or by magnetic means.

DETAILED DESCRIPTION OF THE INVENTION

Figure 1:
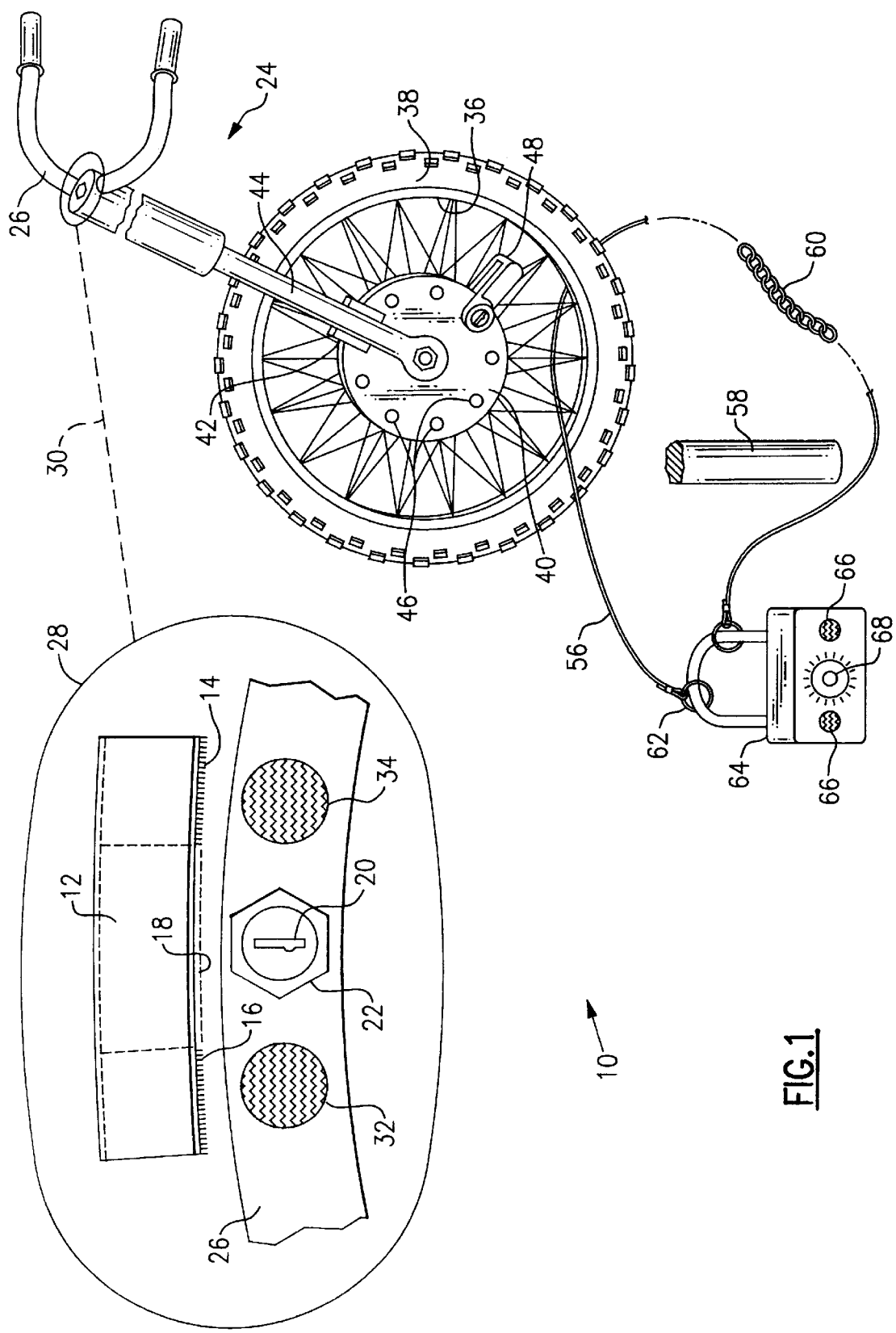
FIG. 1 is a view in perspective of a lock reminder system used with an ignition switch of a motorcycle. The system is used with a disk brake locking device and also with a cable and chain locking device. An enlarged view of the ignition switch portion is enclosed in a circle.

Referring to FIG. 1 is shown, a lock reminder system, identified in general by the reference numeral 10.

The lock reminder system 10 includes a covering 12 that is a flexible sheet of material that is approximately one inch wide by five inches long, although the size is varied as desired to suit the installation at hand.

The covering 12 includes a pair of members 14, 16 of a first half of a hook and loop fastening system attached on one side thereof. In the view shown, the pair of members 14, 16 are attached to the underside of the covering 12.

If preferred, the pair of members 14, 16 may be replaced by a single continuous member, shown in dashed lines and identified by the reference numeral 18. When used in place of the pair of members 14, 16, the continues member 18 is disposed along the entire length of the covering 12.

The use of the continuous member 18 (as the first half of a hook and loop fastening system) is generally preferred because it serves as to aid in installation, as is described in greater detail hereinafter.

The covering 12 may be transparent or opaque although opaque is preferred. The continuous member 18 may, by itself, be used to form the covering 12. Alternatively, it may be attached to another flexible (i.e., a cloth) member (not shown) which together form the covering 12. For example, the cloth member may contain advertising information and it can be attached to the continuous member 18 by sewing it to the top of the continuous member 18 in order to form the covering 12.

The covering 12 is shown disposed above a keyhole 20. The keyhole 20 is part of an ignition switch 22 for a motorcycle, as identified in general by the reference numeral 24. Only a portion of the motorcycle 24 is shown.

The ignition switch 22 for many types of the motorcycle 24 is located in the center area of a handlebar 26. The covering 12 and the ignition switch 22 (and adjacent area) are shown in an enlarged view enclosed by a circle 28. A second dashed line 30 reveals the actual location on the handlebar 26 of detail shown in the circle 28.

The ignition switch 22 may be disposed on the motorcycle 24 at any location that is preferred by either a manufacturer (not shown) or an operator (not shown). The lock reminder system 10 will function the same as described if the ignition switch 22 is located elsewhere than on the handlebar 26.

The covering 12 is shown in the FIG. 1 drawing as being disposed above the keyhole 20 and above the ignition switch 22. In actual use the covering 12 is disposed directly over both the keyhole 20 and the ignition switch 22. It is shown in a position that is elevated above normal use to better reveal details of construction of the lock reminder system 10.

Disposed on both sides of the ignition switch 22 are a first fastener member 32 and a second fastener member 34. The first and second fastener members 32, 34 each include a second half of a hook and loop fastener system. The first and second fastener members 32, 34, as shown, are circular, however, they may be any size and shape that is preferred.

The first and second fastener members 32, 34 are preferably attached to the handlebar 26 by an adhesive or any other preferred means. If the ignition switch 22 is disposed elsewhere, then they are attached to the surrounding structures on both sides thereof.

A common type of a hook and loop fastener system is marketed under the tradename "VELCRO". As is well known in the arts either of the first or the second halves of a hook and loop fastener is a hook portion and the remaining half is a loop portion. When contact is made between the two halves, adhesion occurs therebetween. To separate the halves of a hook and loop fastener, a sufficient force is applied to either half to pull it away from a position of cooperation with the remaining half.

Accordingly, the pair of members 14, 16 (or the continuous member 18) may be either the hook or the loop portions of the hook and loop fastener system. Similarly, the first and second fastener members 32, 34 may also be either the hook or the loop portions. The requirement is that whichever (i.e., the hook or the loop portion) is used for either the pair of members 14, 16 or the continuous member 18, the first and second fastener members 32, 34 must be the opposite.

For example, if the pair of members 14, 16 or the continuous member 18 are formed of a loop portion, then the first and second fastener members 32, 34 must be formed of the hook portion. Conversely, if the pair of members 14, 16 or the continuous member 18 are formed of a hook portion, then the first and second fastener members 32, 34 must be formed of the loop portion.

When the covering 12 is placed over the ignition switch 22 so as to make contact with the first and second fastener members 32, 34, it is fastened thereto and held in place. In this position, the covering 12 blocks access to the ignition switch 22. It is not possible to operate the motorcycle 24 when the covering 12 is applied over the ignition switch 22 because a key (not shown) can not be inserted into the keyhole 20.

The lock reminder system 10 may be sold as an aftermarket product for use with a variety of locking devices, as described in greater detail hereinafter. Alternatively, the various manufactures of the various locking devices may wish to include the lock reminder system 10 when they sell their locking devices.

Regardless of the marketing strategy that is employed, it is likely that the operator will have to install certain component parts of the lock reminder system 10 to either the motorcycle 24 or to the locking devices. For example, the operator will install both of the first and second fastener members 32, 34 on either side of the ignition switch 22. A peel-off adhesive backing (not shown) as is well known in the adhesive arts may be used for this purpose, if desired.

Because the operator may vary the location selected for the first and second fastener members 32, 34, installation of the covering 12 may be easier if the continuous member 18 is used. The careful placement of the first and second fastener members 32, 34 on the motorcycle 24 becomes more important when the covering 12 is made using the pair of members 14, 16 as does the proper alignment of the covering 12 when it is placed over the pair of members 14, 16.

A wheel 36 includes a tire 38 and a disk 40 attached thereto. A brake caliper 42 is normally attached to a fork tube 44. As is well known in the arts, the brake caliper 42 pinches the disk 40 which is used for braking of the motorcycle 24.

It is common for the disk 40 to have a plurality of disk holes 46 provided therein. The disk holes 46 reduce the weight of the disk 40, help to keep it cool, and generally improve braking performance. Accordingly, a variety of locks have been designed to help prevent theft of the motorcycle 24 that rely upon use of at least one of the disk holes 46.

Figure 4:
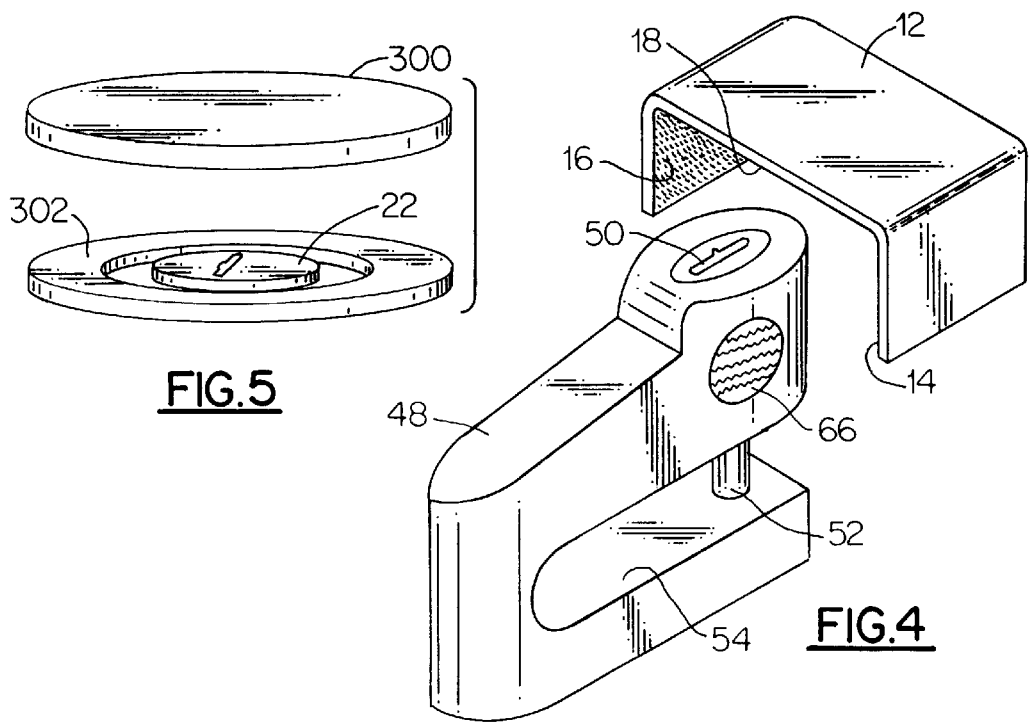
FIG. 4 is a view in perspective of the disk brake locking device as shown in the FIG. 1 drawing.

An example of such a lock is a disk locking device 48 shown attached through one of the disk holes 46 to the disk 40. Referring on occasion also to FIG. 4, a detailed view of the disk locking device 48 is provided.

The exact way in which the disk locking device 48 of FIG. 4 is used is different than that as shown in FIG. 1 because it is not attached to the motorcycle 24 in the FIG. 4 drawing. These differences, which are essential to the effective use of the lock reminder system 10, are described in greater detail hereinafter.

The disk locking device 48 includes a second keyhole 50. A second key (not shown) is used to secure or to open the disk locking device 48 by placing it in the second keyhole 50 and rotating it, as is common with locks in general.

When the second key is rotated, a pin 52 is either raised or lowered. The pin 52 is raised to remove the disk locking device 48 from a position of cooperation with one of the disk holes 46. The pin 52 is lowered and passes through one of the disk holes 46 to attach the disk locking device 48 to the disk 4 of the motorcycle 24.

The disk locking device 48 includes an anvil 54 portion. The pin 52 bears upon the anvil 54 portion when the disk locking device 48 is secured in position. This prevents removal of the disk locking device 48 apart from the disk 40. Security is provided because the wheel 36 can only be rotated an amount that is less than one revolution. In less than one revolution, the disk locking device 48 will make contact with either the fork tube 44 or the caliper 42 and prevent the wheel 36 from rotating further.

The operation of the disk locking device 48, as was described hereinabove, is well known in the arts and provides an understanding of the basic use of the disk locking device 48. This is useful in understanding installation and removal of the lock reminder system 10, as is described in greater detail hereinafter.

The FIG. 1 drawing shows the disk locking device 48 attached to the disk 40. The motorcycle 24 is not suitable for use without incurring a risk of damage when the disk locking device 48 is attached to the disk 40.

The lock reminder system 10 is suitable for use with other types of locks or locking devices, in general. To illustrate this, a cable 56 passes through the wheel 36 and around a post 58. A section of a chain 60 is shown as part of the cable 56 to indicate that the entire length of the cable 56 may be formed using the chain 60 instead of the cable 56.

A pair of rings 62 are provided at the end of the cable 56. A combination lock 64 is used to secure the cable 56 in position. The cable 56 may be used in place of the disk locking device 48 or in combination with it (if even more security from theft is desired).

When the motorcycle 24 is secured by any locking device, such as by the disk locking device 48 or the cable 56 and the combination lock 64 it is important to provide a reminder to the operator not to use the motorcycle 24 without first removing the locking device from the motorcycle 24.

When the lock reminder system 10 is used, prior to attaching the locking device (of any type) to any part of the motorcycle 24, the covering 12 is first placed over the ignition switch 22. When the operator returns to use the motorcycle 24, he is unable to insert the key into the keyhole 20 because of the covering 12. The covering 12 reminds him that he must first remove all locking devices. In this case, the operator would first remove the disk locking device 48 and, if attached as well, the cable 56 and the combination lock 64.

After the locking devices have been removed, the operator then removes the covering 12 by pulling it off of a position of cooperation covering the ignition switch 22. The operator may now insert the key into the keyhole 20 and operate the motorcycle 24 without fear of damage. However, to properly use the lock reminder system 10, the covering 12 must be properly stowed.

The covering 12 is properly stowed by placing it over the second keyhole 50 of the disk locking device 48. A second pair of fastener members 66 (only one of which is shown in the FIG. 4 view) are attached on opposite sides of the second keyhole 50 and are constructed so as to be similar in construction and of the same half (i.e., either the hook or the loop portion) of the hook and loop fastener system as are the first and second fastener members 32, 34.

This ensures that the covering 12 can be secured over the disk locking device 48 whenever it is not secured over the ignition switch 22. The covering 12 in the FIG. 4 drawing is shown elevated above its point of attachment to provide improved clarity of construction. In normal use, the covering 12 is draped over the disk locking device 48 and is brought into contact with the second pair of fastener members 66 so as to secure it in place and also to prevent access to the second keyhole 50.

When the operator once again wishes to attach the disk locking device 48 to the motorcycle, he finds that he is unable to insert the second key into the second keyhole 50 because the covering 12 prevents doing so. In this manner, he is reminded to remove the covering 12 off of the disk locking device 48 and to place the covering 12 over the ignition switch 22. After doing so, he would attach the disk locking device 48 to the motorcycle 24.

This order of steps ensures that the covering 12 will always be disposed either over the ignition switch 22 or over the disk locking device 48 (or over any other type of a locking device), as needed to properly remind the operator what is required next.

In summary, the covering 12 is placed over the ignition switch 22 just before the disk locking device 48 is attached to the disk 40 of the motorcycle 24. The covering 12 is placed over the second keyhole 50 of the disk locking device 48 after it is removed from the ignition switch 22.

The second pair of fastener members 66 are shown attached to both sides of a combination tumbler 68 of the combination lock 64. If the combination lock 64 is used instead of the disk locking device 48, the covering 12 is placed over the combination tumbler 68 after it is removed from the ignition switch 22.

The second pair of fastener members 66 are attached to either the disk locking device 48 or to the combination lock 64 by an adhesive, similar to that used to attach the first and second fastener members 32, 34 to the motorcycle 24. The adhesive may be under a peel-off sheet (not shown) or it may be in a tube (not shown) that is applied when and where desired.

It is noted that consistent with the description as provided hereinabove, that in the FIG. 1 view the covering 12 is disposed over the ignition switch 22. The covering 12 is not disposed over either the disk brake locking device 48 or over the combination tumbler 68 of the combination lock 64. When a locking device is attached to the vehicle, in this example to the motorcycle 24, the covering 12 is always disposed over the control switch (i.e., the ignition switch 22) and never over the locking device.

Figure 3:
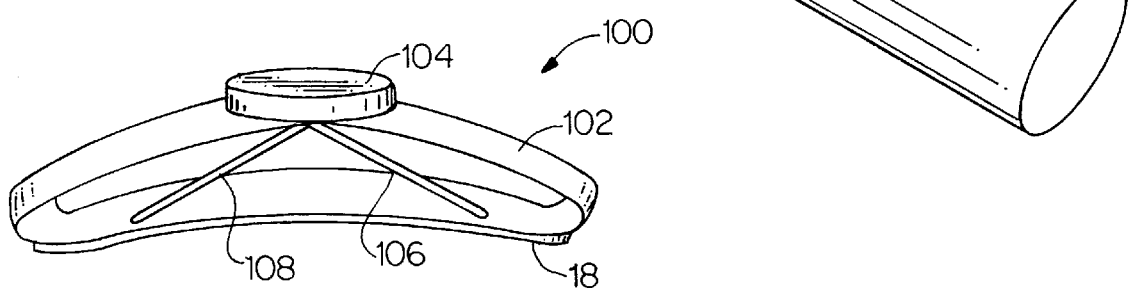
FIG. 3 is a view in perspective of an alternate embodiment of a covering portion of the system that is adapted for easy removal of the covering portion.

Referring now also to FIG. 3, a modified covering, identified in general by the reference numeral 100, is shown. The modified covering 100 includes a loop of material 102. A button 104 is located in the loop 102. The continuous member 18 is attached to the loop 102 at a distal end with respect to the button 104.

The button 104 is intended to help remove the modified covering 100 from a position of cooperation over the ignition switch 22 or over the second keyhole 22. It provides an object to grasp and pull.

Attached to the inside of the button 104 and extending generally toward opposite ends of the continuous member 18 are provided a first elastic member 106 and a second elastic member 108. When the button 104 is pulled it imparts a force to both the first and second elastic members 106, 108 that tends to separate the center portions of the loop 102 of the modified covering 100 apart from either the ignition switch 22 or the second keyhole 22.

Pulling on the button 104 also imparts a force to the loop 102 generally that helps to dislodge the outer portions thereof from a position of contact with the ignition switch 22 or the second keyhole 22.

Accordingly, the modified covering 100 provides a convenient way to remove it from either the ignition switch 22 or the second keyhole 22 simply by applying a quick force to pull the button 104.

Figure 2:
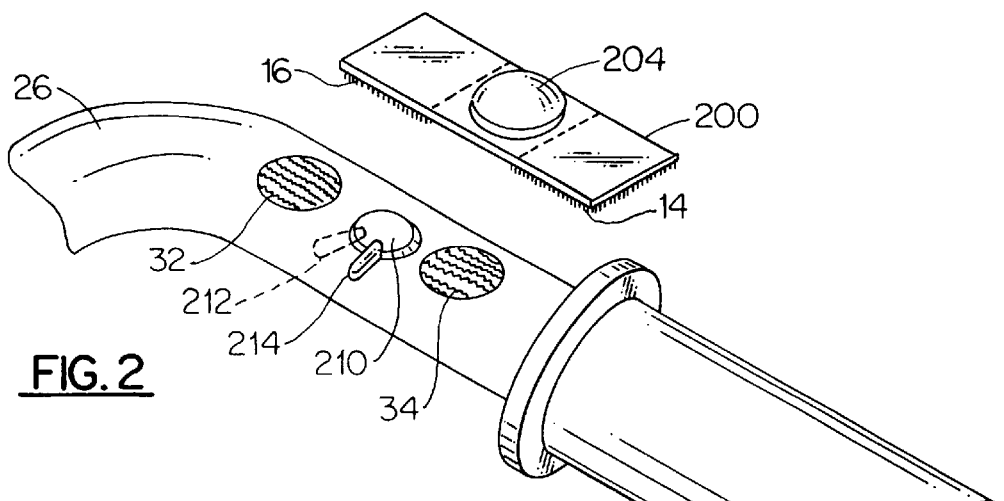
FIG. 2 is a view in perspective of a lock reminder system used with an engine kill switch of a motorcycle.

Referring now also to FIG. 2, a second modified covering 200 is shown. The second modified covering 200 is identical to the covering 12 but also includes a plain button 204 that is similar to the button 104 that was used on the modified covering 100, but without the a first elastic member 106 and a second elastic member 108. The plain button 204 aids in grasping the second modified covering 200.

An engine kill switch 210 is attached to the handlebar 26, as is normal with the motorcycle 24 and many other types of motor vehicles. It is noted that while the motorcycle 24 is the type of vehicle that is used to describe the lock reminder system 10, its use is not so limited. Rather, the lock reminder system 10 may be used with any type of a motor vehicle or a machine that has a switch of some sort that can be used to disable operation of the vehicle or the machine.

The engine kill switch 210 stops an engine (not shown) of the motorcycle 24 from running if it is moved from a first position 212 (shown in a dashed line) into a second position 214.

When the lock reminder system 10 is used with the engine kill switch 210, the engine kill switch 210 is first placed into the second position 214 which prevents starting and therefore also operating of the motorcycle 24.

After the engine kill switch 210 is placed into the second position 214, the second modified covering 200 is placed over the engine kill switch 210 and is secured to the first and second fastener members 32, 34 that are now attached to the handlebar 26 on both sides of the engine kill switch 210. Of course, either the covering 12 or the modified covering 100 could be used in place of the second modified covering 200.

Even if the operator were to insert the key into the keyhole 22 and attempt to start the motorcycle 24 with the ignition switch 22, it would not run because the engine kill switch 210 (in the second position 214) will not permit it to do so.

Again, once the operator sees the second modified cover 200, he is reminded of the need to remove any locking devices from the motorcycle, remove the second modified covering from the engine kill switch 210, and attach the second modified covering 200 over the locking device.

Figure 5:
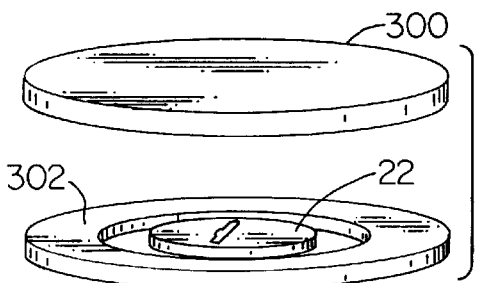
FIG. 5 is a vies in perspective of an alternate embodiment of the system that uses magnetic attraction to secure the covering portion in place.

Referring now also to FIG. 5, an alternate embodiment of the lock reminder system 10 is shown that includes a flat disk shaped member which provides a covering portion 300 for use over the ignition switch 22.

A ring 302 is attached around the ignition switch 22. The ring 302 is attached by an adhesive or other preferred means, such as magnetic attraction.

The covering portion 300 is attracted and secured to the ring 302 by magnetic attraction. Accordingly, the covering 300 may be either a magnetic material or a ferrous material, such as steel. The ring 302 may be either a magnetic material or a ferrous material. However, both the ring 302 and the covering portion 300 may not both be ferrous, or there would be no magnetic attraction.

A second ring (not shown) must similarly be disposed around the second keyhole 50.

In use, the covering portion 300 is placed on the ring 302 (over the ignition switch 22) when locking devices are attached to the motorcycle 24 and it is placed over the second keyhole (of the locking devices) when they are removed from the motorcycle.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A lock reminder system for use with a machine and a locking device, comprising:
    (a) means for covering a control switch of said machine;
    (b) first means for detachably-attaching said means for covering to a location blocking access to said control switch; and
    (c) second means for detachably-attaching said means for covering to a location blocking access to said locking device;
    whereby said means for covering is adapted for covering said control switch when said locking device is affixed to said machine and for covering said locking device when said locking device is not affixed to said machine.
2. The lock reminder system of claim 1 wherein said control switch includes a keyhole opening.
3. The lock reminder system of claim 1 wherein said control switch includes an ignition switch.
4. The lock reminder system of claim 1 wherein said control switch includes an engine kill switch.
5. The lock reminder system of claim 1 wherein said machine includes a motor vehicle.
6. The lock reminder system of claim 5 wherein said motor vehicle includes a motorcycle.
7. The lock reminder system of claim 1 wherein said locking device includes a key-actuated lock.
8. The lock reminder system of claim 1 wherein said locking device includes a combination type of a lock.
9. The lock reminder system of claim 1 wherein said locking device includes a disk brake locking device.
10. The lock reminder system of claim 1 wherein said locking device includes a cable locking device.
11. The lock reminder system of claim 1 wherein said locking device includes a chain locking device.
12. The lock reminder system of claim 1 wherein said first means for detachably-attaching includes a first part of a hook and loop fastener attached proximate to said control switch and a second part of a hook and loop fastener attached to said means for covering.
13. The lock reminder system of claim 1 wherein said second means for detachably-attaching includes a first part of a hook and loop fastener attached proximate to said locking device and a second part of a hook and loop fastener attached to said means for covering.
14. The lock reminder system of claim 1 wherein said first means for detachably-attaching includes a ferrous member attached proximate to said control switch and a magnet attached to said means for covering.
15. The lock reminder system of claim 1 wherein said first means for detachably-attaching includes a magnet attached proximate to said control switch and a ferrous member attached to said means for covering.
16. The lock reminder system of claim 1 wherein said second means for detachably-attaching includes a ferrous member attached proximate to said locking device and a magnet attached to said means for covering.
17. The lock reminder system of claim 1 wherein said first means for detachably-attaching includes a magnet attached proximate to said locking device and a ferrous member attached to said means for covering.
18. The lock reminder system of claim 1 wherein said means for covering includes a sheet of flexible material.
19. The lock reminder system of claim 18 wherein said flexible material includes a first portion of a hook and loop fastener system.
20. The lock reminder system of claim 18 wherein said flexible material includes a button adapted for grasping attached thereto.
21. The lock reminder system of claim 18 wherein said flexible material includes a loop of flexible material.
22. A method for reminding an operator a locking device is attached to a machine, which comprises:
    (a) covering a control switch of said machine with a covering when said locking device is attached to said machine;
    (b) covering a portion of said locking device with said covering when said locking device is not attached to said machine;
    (c) preventing the operation of said machine when covering said control switch with said covering; and
    (d) preventing the operation of said locking device when covering said portion of said locking device with said covering.
23. A method for reminding an operator to attach a locking device to a motor vehicle, which comprises:
    (a) removing a covering from at least a portion of said locking device;
    (b) attaching said covering proximate a control switch of said motor vehicle whereby said control switch is rendered inaccessible; and
    (c) attaching said locking device to said motor vehicle.
24. A method for reminding an operator a locking device is attached to a motor vehicle, which comprises:
    (a) rendering a control switch of said motor vehicle inaccessible by placing a covering in a position proximate said control switch;
    (b) removing said locking device from said motor vehicle; and
    (c) removing said covering from said position proximate said control switch.
25. The method of claim 24 including the step of attaching said covering to a portion of said locking device after completing the step of removing said covering from said position proximate said control switch.
26. The method of claim 24 wherein said covering includes means for detachably-attaching said covering in said position proximate said control switch and for detachably-attaching said covering to said locking device.

* * * * *